Aug. 8, 1950 A. REIS 2,518,253
METALLIC SEALING RING
Original Filed April 5, 1946 2 Sheets-Sheet 1
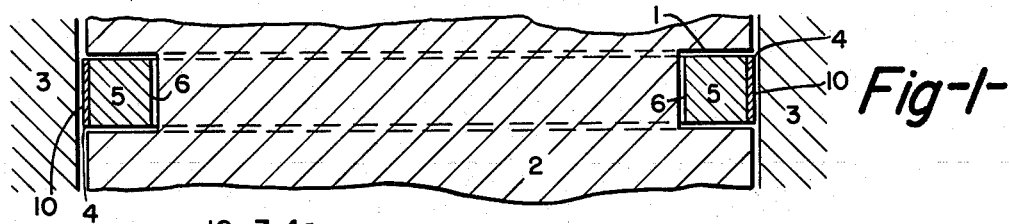
Fig-1-
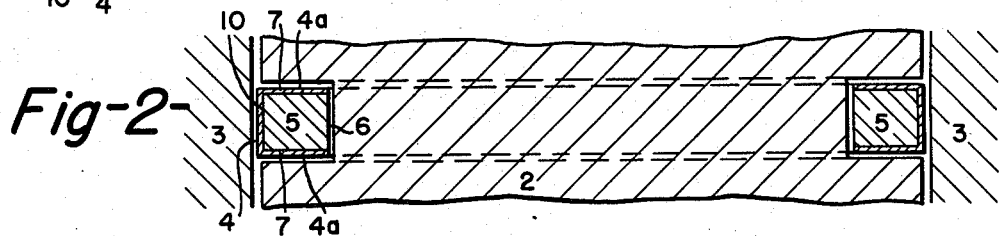
Fig-2-
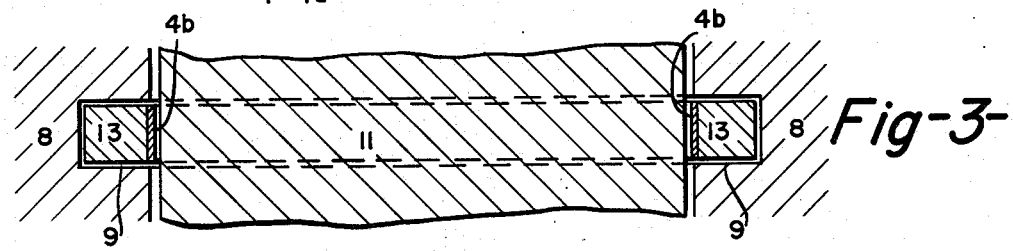
Fig-3-
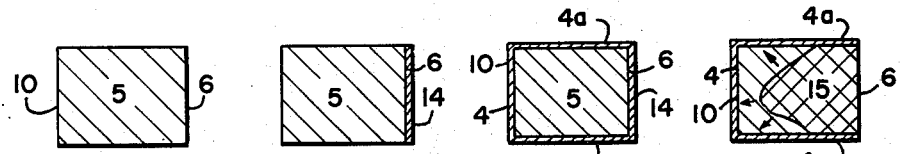
Fig-7- Fig-8- Fig-9- Fig-10
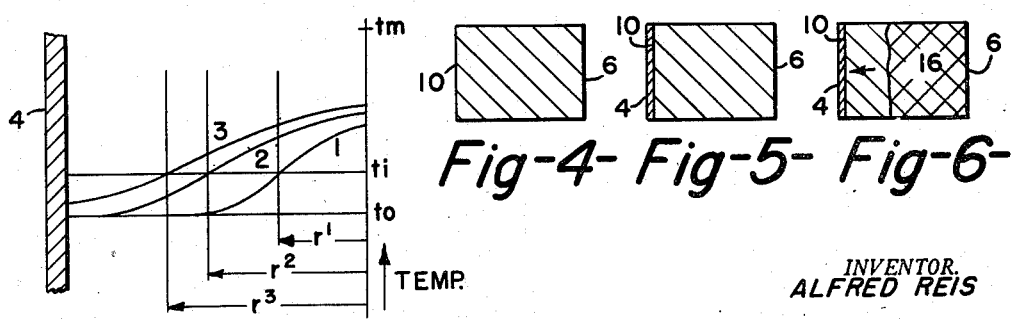
Fig-4- Fig-5- Fig-6-
Fig-13-
INVENTOR.
ALFRED REIS
BY
ATTORNEY Aug. 8, 1950  A. REIS  2,518,253
METALLIC SEALING RING
Original Filed April 5, 1946  2 Sheets-Sheet 2
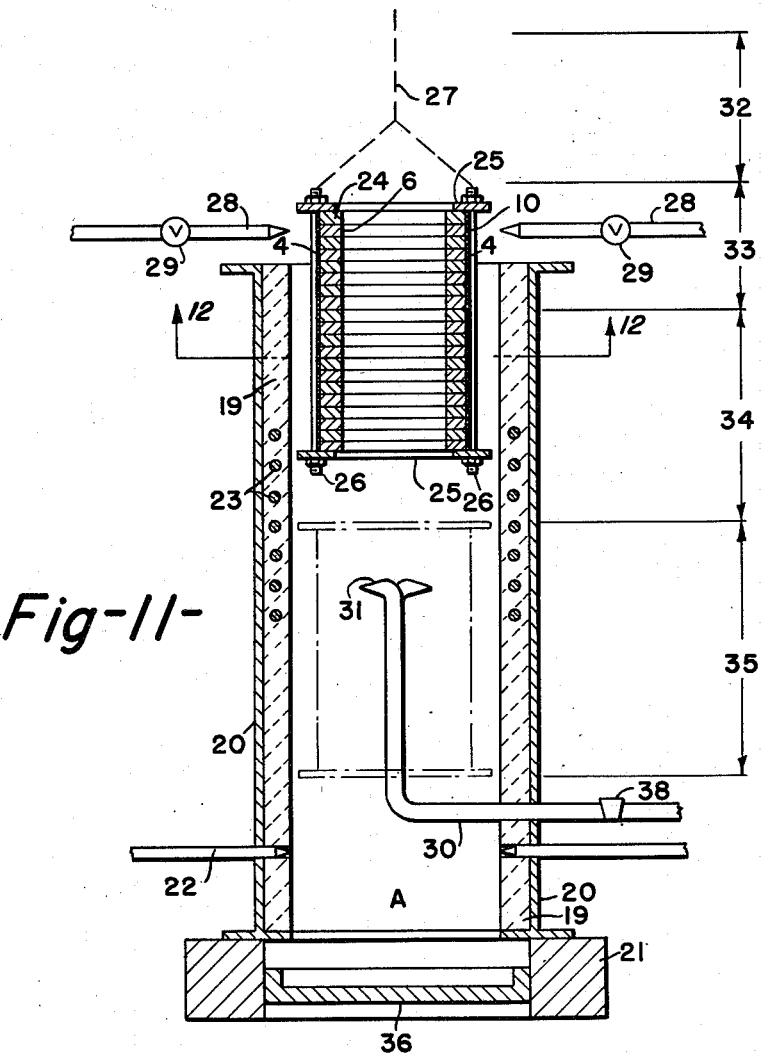
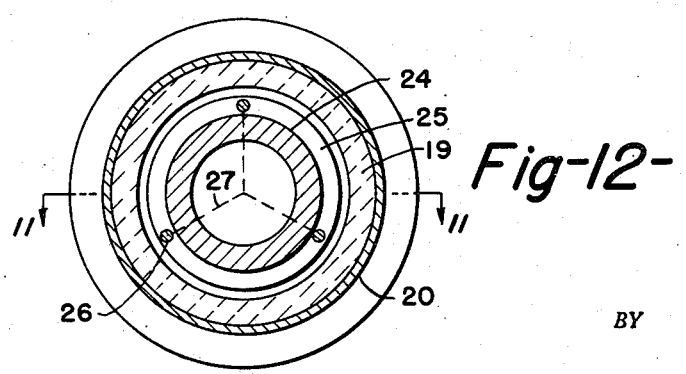
INVENTOR.
ALFRED REIS
BY
ATTORNEY Patented Aug. 8, 1950

2,518,253

UNITED STATES PATENT OFFICE 2,518,253

METALLIC SEALING RING

Alfred Reis, New York, N. Y., assignor to American Measuring Instruments Corporation, New York, N. Y.

Substituted for abandoned application Serial No. 660,002, April 5, 1946. This application April 14, 1949, Serial No. 92,589

3 Claims. (Cl. 75—22)

The invention relates to metallic sealing rings of the external and of the internal type and it relates especially to piston rings and to sealing rings for stuffing boxes. The instant application is a substitute for U. S. patent application Serial No. 660,002, filed April 5, 1946, now abandoned.

Numerous attempts have been made to produce metallic sealing rings which combine the high mechanical values of a dense metal with the anti-frictional property and wear resistance of a porous lubricant retaining and self-lubricating material.

To achieve this end metallic sealing rings have been provided with porous surface layers by subjecting dense metal rings to a superficial chemical action or by producing on the same non-metallic coatings. Cast iron rings have, for instance, been immersed in acids to dissolve the metallic component of the surface and then graphite has been deposited in the thus created cavities to form a composite graphitic bearing face. Attempts have also been made to create porous surface layers on metallic sealing rings by electrolytic action.

However, the porous surface layers produced by these methods greatly differ structurally from the lubricant retaining metallic materials used for self-lubricating bearings and do not possess their anti-frictional property and wear resistance.

In recognition of this insufficiency powder metallurgical methods, which have recently been developed to a high standard, have been applied to this manufacturing field and piston rings have been made from compressed metal powders. The thus produced sealing rings are lubricant retaining and self-lubricating; but they lack in mechanical properties and they are particularly with regard to strength, elasticity and thermal resistance inferior to sealing rings made of dense metal.

Articles made by metal powder metallurgical methods and possessing a throughout porous structure have been strengthened by impregnation with molten metal whereby the ability of these articles to avidly absorb the molten metal within its porous skeleton structure has been very helpful. However, as the pores are filled with metal by the impregnation, the article loses its lubricant retaining property and therefore its anti-frictional function and also its wear resistance.

It is a primary object of the invention to render the metal impregnation of articles made by powder metallurgical methods usable for the production of metallic sealing rings which combine the superior mechanical values and thermal resistance of the dense metal, its strength, heat resistance, elasticity, permanence of tension with a high degree of self-lubrication and wear resistance.

It is an equally important object of the invention to fully preserve and improve in the operative surface layers of a sealing ring the original porosity, lubricant retaining and self-lubricating capacity inherent in articles produced by powder metallurgical processes.

It is also an object of the invention to produce metallic sealing rings which have superficial layers of superior self-lubricating action compared with those produced by the chemical or electrolytical surface treatment of cast sealing rings.

It is another object of the invention to eliminate in the processing of metallic sealing rings the use of corrosive substances and particularly also of corrosive liquids.

It is also an object of the invention to eliminate the difficulties heretofore encountered in the proper "fitting" of the sealing rings and especially piston rings to cylinders of internal combustion engines and the like.

It is another object of the invention to create at the operating faces of the sealing ring uniform lubricant retaining layers.

It is another object of the invention to provide sealing rings which due to their self-lubricating property will not stick to the walls of the cylinders and to eliminate the danger of small pieces of metal being torn out of the ring and wedged between the piston and the cylinder.

It is an important object of the invention to produce a sealing ring which does not require a run-in-period.

It is also an object of the invention to shorten the manufacturing time of the sealing rings and to reduce the manufacturing costs.

With the above recited and other objects in view which will become apparent as this specification proceeds, the invention comprises in its broad aspects:

The manufacture of a sealing ring by a powder metallurgical method, possessing therefore a throughout porous structure and a high degree of lubricant retaining self-lubricating action and wear resistance.

The preservation of this uniformly porous structure and lubricating retaining action in at least one surface layer of the ring and The conversion of the remaining main part of the ring into a dense metal body having a high strength and thermal resistance.

The invention also comprises the thus produced sealing ring.

The conversion of the main part of the ring into a dense metal body is effected by impregnation with a suitable molten metal. Prior to this impregnation the rings have a uniformly porous structure, the pores forming a system of communicating channels. Care is taken by the usual precautions used in powder metallurgy procedures to keep the surfaces of the pores pure. The molten metal is absorbed in the pores of the rings at a minimum temperature of rapid impregnation which varies with the individual impregnating metal.

The impregnation results in a dense strong product. As a very thin surface layer of between about 0.001 to 0.01 inch thickness only is excluded from the impregnation, the mechanical values of a ring made in conformity with the teachings of this invention is not inferior with regard to its mechanical and thermal properties to cast rings; therefore these sealing rings fully comply with the mechanical and thermal requirements of a high quality sealing ring. A sealing ring made by any known powder metallurgical method from iron or steel powder may be impregnated with metals having a suitable melting point, such as copper, tin, silver, aluminum, magnesium and their alloys. The ring also may be made of other than ferrous as, for instance, nickel or copper powders. The rules governing the metal impregnation of metal powder compressed articles and the utilization of the temperature ranges of rapid impregnation are known and it is not deemed necessary to dwell upon this matter in detail.

The invention, however, comprises special measures in connection with this impregnating step whereby the trapping of gases in the pores is avoided which would result in an incomplete filling of the pores.

The above indicated measures are differentiated in the various embodiments of my invention in conformity with the number and location of the ring faces to exert anti-frictional functions and to be preserved with regard to their porous lubricant retaining structure. These measures will be described in detail, as this specification proceeds.

The maintenance of a throughout porous structure and of lubricant retaining and self-lubricating property in the operating surface layer or layers of the sealing rings is secured by preventing the molten metal from penetrating into these layers. In other words, a thin surface layer of determined depth which may vary from about 0.001 to about 0.01 inch is kept free from the impregnation by the molten metal. Due to the specific treatment, which is hereafter described, the surfaces of the pores within this superficial layer lose their wetability by the molten metal and become repulsive to the entrance of the same; at the same time the pores of these surface layers remain gas permeable and allow the free escape of the gases which are expelled from the ring by the molten metal entering in the body of the ring and advancing through the same.

The treatment which prevents the molten metal from penetration into the lubricant retaining surface layer or layers comprises applying to the selected ring faces a controlled quantity of a non-aqueous liquid having a good wetting property to effect a uniform spreading of the same throughout the depth controlled surface layer; this liquid entering the pores does not fill the same but forms on the pore surfaces or pore walls a thin coherent liquid and/or solid film; this film strongly adhering to the pore faces prevents the penetration of the impregnating metal which advances through the main body of the ring towards these surface layer or layers.

Nonaqueous liquids possessing the here required wetting, spreading and film forming property are preferably neutral oils and tars which fall in oil refineries and in the distillation plants of coal and other organic materials.

Their wetting and spreading capacity may be enhanced and controlled by the admixture of typical wetting agents of non-oxidizing nature, such as long chain alcohols, e. g. cetyl alcohol, esters and the like.

The fluidity of the liquid may be improved by the admixture of thinners such as low molecular oils and of solvents consisting of hydrocarbons. Oils and tars of anthracenic or naphthenic nature may be added to improve the adherence of the film produced by the wetting treatment to the walls of the pores. The film deposited by the treatment on the pore walls may be a liquid or a solid film or a mixture thereof; its formation in these various states will greatly depend on the temperature reached during the treatment and the resulting degree of decomposition of the wetting liquid.

The rule which dominates the character and the composition of the wetting and film forming liquid is that the same spreads equally in a thin layer of uniform thickness over the surface of the pores; the depth of liquid penetration is controlled by the quantity of liquid applied.

The wetting treatment should be preferably carried-out at an elevated temperature where the increased fluidity and surface tension of the liquid favor the formation of a uniform film on the surface of the pores; however, with suitable wetting liquids the treatment may be also carried out at room temperature.

Immediately upon the above described surface treatment the rings are either heated or if the treatment has been already carried-out at an elevated temperature further heated to a point which is adapted for the metal impregnating step.

During the application of the wetting liquid and the heating-up period the following phenomena take place.

The volatile components of the organic wetting liquid which in the form of a film is distributed throughout the selected surface layer will gradually vaporize and displace the air enclosed within the wetted pores. As the temperature ascends further, decomposition will take place of the liquid film and a solid adherent film may be established on the walls of the pores which is covered by a liquid or pasty film; in any way this film renders the pores of the treated surface layer of the ring non-wettable by and repulsive to the entrance of the molten metal used for the impregnation of the remaining main body of the ring; on the other hand it makes this surface layer well wettable by the lubricant applied to the operating face of the sealing ring in actual operation.

The wetting liquid must be so chosen that the vapors produced prior to or during the metal impregnation do not oxidize or otherwise attack or contaminate the porous surface or the impregnating metallic melt; if hydrocarbons are used, as explained above, this purpose will be well served. It is also important that during or after the creation of the films on the pore faces the formation of bubbles or froth in the pores is prevented as such occurances may obstruct the pores of the self-lubricating layers and prevent the escape of gases from the ring during the advance of the metal impregnation. The formation of bubbles and froth can well be prevented by proper control of the surface tension between the liquid and the vapors and gases produced therefrom and by extending the vaporization of the liquid over a wide temperature range. If care is taken to avoid sudden increase of temperature, the production of bubbles and froth within the pores can be definitely excluded.

The porous surface layers of the sealing rings produced by powder metallurgical processes to which an adherent film is applied in the above described manner are not wetted by molten metal; on the other hand, and as stated above, the metallic melt is easily absorbed by the non-treated porous main body of the rings.

The wetting treatment may be applied either to the outer or to the inner ring face alone or simultaneously also to the plane faces, as in detail explained below.

If only one cylindrical outer or inner ring face is to be treated with the view of its later service as a lubricant retaining self-lubricating layer, the rings may be stacked for treatment upon each other throughout the entire treatment.

Piston rings are liquid treated at their outer cylindrical face and the molten impregnating metal is applied to the inner cylindrical face; in the treatment of rod type rings, rings for stuffing boxes and the like, this treatment is reversed.

For the production of rings having lubricant retaining surface layers in one cylindrical and in both plane faces, the inner cylindrical face is previously metal coated.

Several methods for the treatment of the ring faces and for the impregnation of the remaining main part of the rings with molten metal are in detail described in the following and illustrated by means of the accompanying drawings.

In the drawings:

Fig. 1 is a diagrammatical vertical cross-section of a piston ring of the external type located in a piston with its outer cylindrical lubricant retaining self-lubricating face adjacent to the cylinder wall, the cylinder and the piston being only partly shown, Fig. 2 is a vertical cross-section similar to that of Fig. 1 of the ring with lubricant retaining self-lubricating surface layers being shown as applied to the two plane faces as well as to the cylindrical outer face, Fig. 3 is a diagrammatical vertical cross-section of a sealing ring of the internal type located in a stuffing box with its inner cylindrical self-lubricating face adjacent to an inner cylindrical guide member, the latter as well as the stuffing box being only partly shown, Figs. 4, 5, 6 are diagrammatical vertical cross-sections of one side of a piston ring shown in Fig. 1 in the course of its main manufacturing steps, Figs. 7, 8, 9, 10 are diagrammatical views of a modification of the manufacturing steps for the production of a sealing ring shown in Fig. 2, Fig. 11 is a vertical cross-section of a chamber for the treatment of a ring stack, Fig. 12 is a horizontal cross-section on line 12—12 of Fig. 11, Fig. 13 is a diagram illustrating the temperature gradient created during the impregnation of the ring shown in Fig. 1.

The piston ring of the external type shown in Fig. 1 is in the usual manner located in a circular recess 1 of a piston 2; the lubricant retaining cylindrical porous outside surface layer which is in sliding contact with cylinder 3 during the displacement of the piston and situated at the outer cylindrical face 10 is indicated by numeral 4 and the metal impregnated main part of the ring by numeral 5; the ratio of thickness of layer 4 and main body shown in the drawing does not correspond to the actual situation, as layer 4 is thinner than shown in the drawing. The inner cylindrical face of the ring is denominated by numeral 6 and the plane faces by numeral 7; the numerals 6, 7 and 10 denominating the various faces of external sealing rings are maintained throughout the Figures 1–3. One side of this ring is on an enlarged scale shown in Fig. 2.

Fig. 2 illustrates a sealing ring having additional lubricant retaining self-lubricating layers 4a which are applied to the two plane faces 7 of the ring.

Fig. 3 shows a sealing ring of the internal or rod type; the ring is located in a circular recess 9 of stuffing box 8. The self-lubricating porous inside layer, which during the operation of the ring is in sliding contact with the inner cylindrical guide members 11 is denominated by numeral 4b and the metal impregnated main part of the ring with numeral 13.

Figs. 4, 5, 6 are diagrammatical vertical sectional elevations of one side of a piston ring during the progress of its treatment.

Fig. 4 illustrates the uniformly porous ring after its manufacture by powder metallurgy operations.

Fig. 5 illustrates the same ring after the application of the wetting liquid to its outside cylindrical face 10 and the creation of an adherent film to the pore faces of the surface layer 4.

Fig. 6 indicates the advance of the metal impregnation 16 which takes place in the direction of the arrow from the cylindrical inside face 6 of the ring towards its outer face 10.

Figs. 7 to 10 are diagrammatical vertical sectional views showing the manufacture of a sealing ring provided with a lubricant retaining self-lubricating porous layer at its cylindrical outside face and at its both plane faces.

Fig. 7 illustrates one side of the porous ring after its manufacture from a metal powder. In accordance with Fig. 8 an adherent metallic coating 14 is applied to its inner face 6 by any customary dry metallizing method. The metal used for the formation of metal coat 14 may be the same as the one later used for the metallic impregation of the ring; however, also a different metal may be chosen to seal up the inner ring face 6; the metal which is used for this coating and sealing step should have a melting point to become liquid during the metal impregnation of the ring. This embodiment of the invention will be described in detail in a later part of this specification. Fig. 9 shows the same ring after the creation of the lubricant retaining surface layers 4, 4a and Fig. 10 indicates the advance of the impregnating metal 15 from face 6 towards the lubricant retaining surface layers 4, 4a.

An apparatus for producing sealing rings in accordance with the invention is shown in Figs. 11 and 12.

The apparatus comprises a preferably cylindrical vertical treating chamber A built of a suitable refractory material 19 and encased by a metal housing 20. The chamber which is open at its upper end is supported on a circular base 21.

The chamber is preferably heated by electrical resistance coil 23 inserted into the refractory wall 19. Tubes 22 are provided to introduce a reducing or inert gas, such as hydrogen, carbon monoxide, nitrogen into the inner space of the chamber.

The piston rings to be treated are stacked upon each other to form a column 24, see also Fig. 11. This column of superimposed rings is supported by a holder which consists of two rings 25 connected by three rods 26; this carrier is vertically movably suspended by chain 27.

By means of this holder the column 24 of stacked rings can be lowered at a controlled speed through the inner space of the treating chamber A.

A plurality of nozzle provided tubes 28 is located directly above the treating chamber A at the outside circumference of ring column 24 for the application of the wetting liquid to the outer cylindrical face of the ring stack. The tubes 28 conducting the wetting liquid to nozzles are provided with valves 29 to control the supply of the wetting liquid.

A tube 30 conducting the impregnating metal and provided at its upper end with a plurality of radial nozzle-provided arms 31 is located in the lower portion of chamber A in such a manner that the descending ring column 24 must pass along the outlets of arm 31. The ring column is shown in full lines during its passage along tubes 28 and in dotted lines during its passage along the outlets of the arms 31. Tube 30 supplies the molten impregnating metal to the inner face of the ring stack.

The treating zones to be successively traversed by ring stack 24 are indicated by numerals 32, 33, 34, 35; numeral 32 indicating the preheating zone, numeral 33 the wetting zone, numeral 34 the heating zone and numeral 35 the metal impregnating zone.

The heat required for the treatment is supplied by the electrical resistors 23.

A container 36 is located underneath chamber A for the accumulation of excess molten metal not absorbed by the ring stack during its passage along the ends of tubular arms 31.

An adjustable refractory valve plug 38 is provided in tube 30 to control the supply of the impregnating metal.

The production of external pistons by means of the above described treating chamber is carried out as follows:

The rings compressed from a suitable metal powder into a throughout porous body are stacked in superimposed relation on holder 25, 36, see also Fig. 11, to form column 24; the inner and outer cylindrical faces 6, 10 of the rings are accordingly exposed to successive treatments.

The holder 25, 26 is at the commencement of the treatment suspended by means of chain 27 in the preheating zone 32 above the upper end of the cylindrical chamber A.

Heat is applied by the resistor element 23, the highest temperature being created in the center section of the chamber, where the heating zone 34 and the upper part of the impregnating zone 35 are located; the temperature decreases gradually toward the upper open end of the chamber; the non-oxidizing or inert gases supplied by tubes 22 and escaping from the upper end of the chamber protect the ring stack against oxidation.

The preheated ring stack 24 is lowered from the preheating zone 32 into and through the wetting zone 33. A controlled quantity of the above described wetting liquid is applied by spray tubes 28 to the outer cylindrical faces 10 of the ring stack, creating the previously described surface layer which is not wettable by molten metal but easily wettable by lubricants.

By proper adjustment of the temperature, by suitable selection of the wetting liquid and particularly its viscosity and the control of the supply of the wetting liquid, the desired depth of the surface layer, the formation of an adherent liquid and/or solid film on the pore faces and the prevention of froth and bubbles in the pores can be easily attained.

The ring stack is lowered through zone 33 and passed into heating zone 34 and finally into the metal impregnating zone 35. Here the molten metal is supplied by tubes 30, 31 to the inner cylindrical faces 6 of the ring stack.

The progress of the impregnation can be controlled by adjustment of the lowering speed of the holder 25, 26 and of the supply of the molten metal; any surplus metal supplied to the ring stack and prevented from entering the wetted and film coated outer cylindrical surface layer 4 will be collected in container 36, which may be heated to keep this metal in a molten state.

The above described treatment can be easily modified to suit the purpose of the manufacture of different types of sealing rings.

The individual steps of the treatment are performed in direct succession to save time and to avoid undesirable chemical reactions on the surfaces of the pores.

Care must be taken, as already stated above, to prevent the formation of vapor or gas bubbles in the pores, as this would impede the escape of gases and perhaps lead to the contamination of the pores beyond the desired depth of penetration.

The temperature to which the stacked rings are heated previous to the metallic impregnation is important; the stacked rings, when brought in contact with the metallic melt, should be heated to a temperature just below the temperature of rapid impregnation. This latter temperature is located slightly above the melting point of the metal, or if the molten metal is very viscous, somewhat higher and to a point where fluidity becomes sufficient for a rapid flow through the narrow pores.

On the other hand, the metallic melt to be applied to the rings is heated to sufficiently high temperature to raise the temperature of the rings in a short time to the temperature for the rapid impregnation; in other words, the temperature of the treatment is so controlled that the rings enter the impregnating zone 35 with a temperature which is below the temperature at which rapid absorption of the impregnating metal occurs; the impregnating metal itself heats the ring stack up to the temperature of rapid impregnation.

While heat is thus transmitted from the melt to the rings, a gradient of temperature is established in radial direction and maintained throughout the period of impregnation. With the rise of temperature, the front line of impregnation advances in radial direction (see Fig. 6), thus preventing the trapping and the enclosure of gases in the rings and securing complete impregnation.

The gases finally escape through the porous superficial layer of the rings.

The temperature gradient through the ring stack towards the lubricant retaining surface layer 4 during the advance of the impregnating metal is illustrated in the diagram shown in Fig. 13, representing a section of one side of the ring stack.

The temperature to which the ring stack has been heated in zone 34 prior to its impregnation in zone 35 is denominated by $t^o$, the temperature of rapid impregnation which is higher than $t^o$ by $t^i$, and the temperature of the impregnating metallic melt which, as previously explained is higher than the temperature of rapid impregnation by $t^m$.

The difference between the temperatures $t^i$ and $t^m$ is so adjusted that the ring stack by the advance of the molten metal is heated to the approximate temperature $t^i$; the increase of the temperature in the stack to the temperature $t^i$ therefore is a forerunner to the advance of the metal; the desired temperature gradient towards surface layer 4 is established in this manner.

The temperature $t^o$ and $t^i$ are represented in the diagram by horizontal lines. The metal is, as previously described, applied to the inner cylindrical face 6 of the ring stack and advances toward the outer surface layer 4 which has been rendered repulsive to metal impregnation.

The vertical lines $r^1$, $r^2$, $r^2$ represent the radial distances traversed by the advancing metal; these distances decrease with the time in accordance with the gradually slowed down advance of the metal.

Curve 1 shows the temperature distribution curve after the advancement of the metal to the radius $r^1$.

At the time of curve 1, all the pores within the radius $r^1$ have been filled with metal, but not beyond that radius.

At the time of temperature distribution according to curve 2, impregnation has progressed to the radius $r^2$.

In this manner the impregnation proceeds until all pores of the ring stack are metal filled with the exception of these located in the outside surface layer 4.

Due to the maintenance of the temperature gradient demonstrated in Fig. 13, a steady metal advance is obtained, the trapping of gases in the pores is prevented and a thorough uniform filling of the pores is accomplished. The impregnation advances in direct dependance upon the temperature distribution indicated by the curves 1, 2, 3 and so forth until all pores of the not treated main body of the ring stack are metal filled.

Sealing rings of the internal or rod type are treated in the form of stacks by a similar procedure as described above. In this case the spray nozzles for the wetting liquid will be placed at the inside of the ring column and the molten metal will be applied to the outside.

The above described embodiments of the invention result in the production of sealing rings having a porous superficial layer at one cylindrical face.

However, the invention may be equally well used for making sealing rings having one cylindrical and two plane faces converted into lubricant retaining self-lubricating surface layers.

The procedure used for this embodiment of the invention will now be described.

In this case the one cylindrical face to be used for the impregnation with molten metal is protected against the treatment with the wetting liquid; therefore the process is commenced by closing the pores of the inner face of the ring stack with metal; this purpose is accomplished by metallization or by another suitable operation, whereby a thin coherent and adherent metallic coating is applied which completely closes the inner face of the ring stack.

The metal used for this purpose may be the same as the one later used for the metallic impregnation or it may be a different metal; however, it must be sufficiently fluid at the temperature of the metallic impregnation.

As the molten metal applied for impregnation advances into the ring, the metal which has been used for closing the pores will act as a pacemaker for the impregnating metal; its composition therefore may be selected to assure an easy union with the impregnating metal, a lowering of the melting point and a higher fluidity at the impregnating temperature.

These purposes are obtained by the coating metal, whereas the metallic composition used for impregnation is selected with a view of its mechanical and thermal properties in the solid state and of the creation of easy impregnating conditions.

The application of the metal coating to the inner ring face is carried-out with the stacked formation of the rings.

After the inner circular face of the ring stack has been metal coated and closed, the rings are unstacked and all other faces are subjected to the above described treatment with the wetting liquid; thereupon the impregnation is effected through the metal coated inner face.

The metallic impregnation may be effected in any suitable manner, for instance by immersion of the liquid treated rings into a bath of molten metal.

The progress of the work in accordance with the above stated second embodiment of the invention is schematically illustrated in Figs. 7–10.

Fig. 7 shows a vertical sectional elevation of one side of the individual porous ring before the commencement of the treatment, Fig. 8 after the closure of its inner face 6 by a metal coating 14, Fig. 9 after the treatment of the other three faces with the wetting liquid and the creation of metal repellant surface layers 4, 4a and Fig. 10 shows the progress of the metallic impregnation in the direction towards the outer surface layer 4 of the individual ring and the two plane surface layers 4a.

In this embodiment of the invention only the inner cylindrical face 6 is accessible to the entrance of molten metal, therefore a trapping of gases in the pores cannot occur. The impregnation will advance from face 6 towards all the other faces which remain open for the escape of the gases, the latter being expelled from the pores of the ring by the advancing metallic melt.

In applying this modification of the invention to rings of the internal or rod type, the latter are stacked and metallized at the outer cylindrical face 10, then unstacked and carried through the above described steps of wetting liquid treatment, heating and metallic impregnation.

The sealing rings made in accordance with this invention combine the superior lubricant retaining self-lubricant anti-frictional and wear resistance properties of porous articles made by powder metallurgical methods with the high elasticity, permanence of tension, static strength, creep resistance, toughness and heat resistance of metallic bodies.

The invention is described by way of example only and equivalent operations and means may

What I claim is:

1. A method for the manufacture of a sealing ring comprising producing the ring by a powder metallurgical process as a coherent article having a throughout porous skeleton structure, applying at an elevated temperature to at least one surface of the ring a controlled quantity of a non-aqueous organic wetting liquid, partly decomposing the liquid and covering the pores of said surface layer with a film formed of the decomposition products which is repulsive to impregnation with a molten metal, preserving at the same time the porous skeleton structure of said surface layer and creating a lubricant retaining self-lubricating face of unrestrained gas permeability and impregnating the remaining main part of the ring with molten metal through at least one of the untreated faces of the ring.

2. A method for the manufacture of a sealing ring comprising producing the ring by a powder metallurgical process as a coherent article having a throughout porous skeleton structure, metal coating one circular face, applying to the other circular and to the plane faces of the ring a controlled quantity of a non-aqueous organic wetting liquid, producing thereby a surface layer, having the pore walls covered with a film which renders the said layers repulsive to impregnation with a molten metal and preserving at the same time the porous skeleton structure of said surface layers, creating thereby lubricant retaining self-lubricating faces of unrestrained gas permeability and impregnating the remaining part of the ring by its immersion into molten metal.

3. A method for the manufacture of a sealing ring comprising producing the ring by compression from a metal powder as a coherent article having a throughout porous skeleton structure, superimposing a plurality of said porous rings to form a ring stack, preheating the same, moving the same through a wetting zone, applying thereby to a circular face of said ring stack a controlled quantity of a non-aqueous organic wetting liquid to form an adherent film on the pore walls of said face, producing thereby a surface layer which is repulsive to impregnation with molten metal, preserving therein the porous skeleton structure and creating a lubricant retaining self-lubricating face of unrestrained gas permeability, raising the temperature of the ring stack and moving the same into a zone for the impregnation with a molten metal, applying to the opposite circular face of said ring stack a stream of molten metal, advancing the molten metal towards said porous surface layer, filling thereby the pores of the remaining main portion of the rings with metal, expelling the gaseous contents of the ring stack through the said porous surface layer and subdividing the treated ring stack into individual rings.

ALFRED REIS.

REFERENCES CITED

The following references are of record in the file of this patent:

UNITED STATES PATENTS

| Number | Name | Date |
|---|---|---|
| 2,159,763 | Hensel | May 23, 1939 |
| 2,402,950 | Culver et al. | July 2, 1946 |
| 2,422,439 | Schwarzkopf | June 17, 1947 |